United States Patent
Yang et al.

(10) Patent No.: US 11,763,540 B2
(45) Date of Patent: Sep. 19, 2023

(54) AUTOMATIC DATA ENHANCEMENT EXPANSION METHOD, RECOGNITION METHOD AND SYSTEM FOR DEEP LEARNING

(71) Applicant: SHANDONG UNIVERSITY, Shandong (CN)

(72) Inventors: Yang Yang, Qingdao (CN); Junjie Wang, Qingdao (CN); Yunxia Liu, Qingdao (CN)

(73) Assignee: SHANDONG UNIVERSITY, Qingdao (CN)

( * ) Notice: Subject to any disclaimer, the term of this patent is extended or adjusted under 35 U.S.C. 154(b) by 329 days.

(21) Appl. No.: 17/341,855

(22) Filed: Jun. 8, 2021

(65) Prior Publication Data

US 2021/0383148 A1 Dec. 9, 2021

(30) Foreign Application Priority Data

Jun. 9, 2020 (CN) .......................... 202010518311.2

(51) Int. Cl.
*G06V 10/25* (2022.01)
*G06N 3/08* (2023.01)
*G06F 18/214* (2023.01)
*G06V 10/774* (2022.01)
*G06V 20/40* (2022.01)

(52) U.S. Cl.
CPC ............ *G06V 10/25* (2022.01); *G06F 18/214* (2023.01); *G06N 3/08* (2013.01); *G06V 10/7747* (2022.01); *G06V 20/46* (2022.01)

(58) Field of Classification Search
CPC .... G06V 10/25; G06V 10/7747; G06V 20/46; G06V 20/40; G06V 10/44; G06F 18/214; G06F 18/217; G06N 3/08; G06N 3/02
USPC .......................................................... 382/103
See application file for complete search history.

(56) References Cited

U.S. PATENT DOCUMENTS

| | | | | |
|---|---|---|---|---|
| 10,210,391 | B1* | 2/2019 | Jones | G06V 20/40 |
| 11,195,037 | B2* | 12/2021 | Lu | G06N 3/045 |
| 11,568,318 | B2* | 1/2023 | Beck | G06V 10/235 |
| 2020/0394415 | A1* | 12/2020 | Aoki | G06T 7/0002 |

* cited by examiner

*Primary Examiner* — Neil R McLean
(74) *Attorney, Agent, or Firm* — Oliff PLC

(57) ABSTRACT

A data enhancement expansion method, recognition method and system for deep learning, the data enhancement expansion method includes the following steps: collecting original video data of a target to be recognized, and extracting original images of several recognized targets from the original video data; extracting seed images of RoI outlines of the recognized targets from the original images; performing an image enhancement operation on the seed images of the RoI outlines of the recognized targets, and randomly extracting the seed images subjected the image enhancement operation for image aliasing enhancement to obtain several composite images; and generating a data set based on the original images of the several recognized targets and the several composite images. Original data materials are easy to obtain with extremely low cost and high authenticity, and can be really put to a deep learning network to achieve good recognition results.

18 Claims, 1 Drawing Sheet

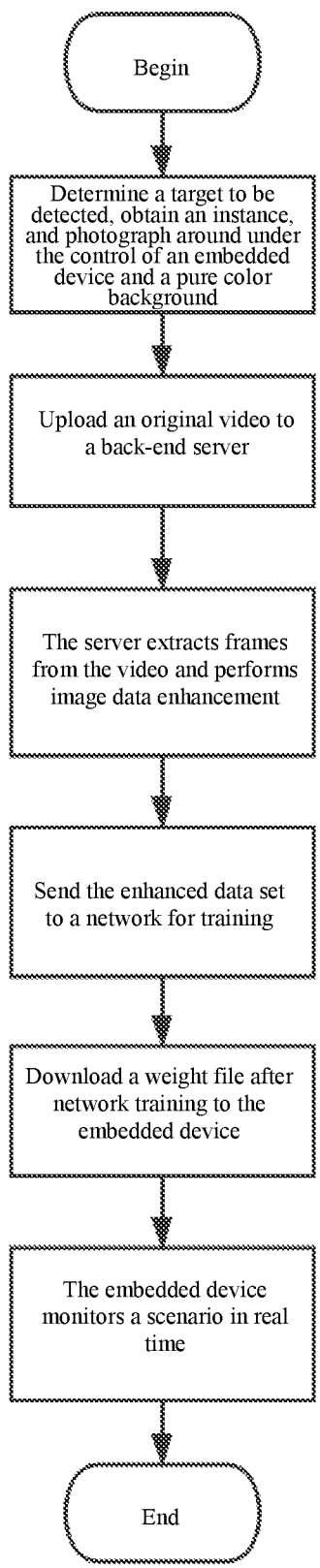

AUTOMATIC DATA ENHANCEMENT EXPANSION METHOD, RECOGNITION METHOD AND SYSTEM FOR DEEP LEARNING

FIELD OF THE INVENTION

The present disclosure relates to an automatic data enhancement method for target recognition, belongs to the field of deep learning computer vision, and specifically designs a data enhancement expansion method, recognition method and system for deep learning.

BACKGROUND OF THE INVENTION

The content of this section merely mentions the background art related to the present disclosure, and does not necessarily constitute the prior art.

Nowadays, in the context of continuous in-depth academic research of deep learning methods, deep learning methods are increasingly deployed in actual scenarios. However, because the success of deep learning methods relies on a large amount of high-quality manually annotated data, the lack of manually annotated labels and training data sets that consume high time and capital costs is an important factor that limits the further application of deep learning networks.

Common annotated open-source public data sets, such as IMAGENET data sets, COCO data sets, and VOC data sets, have very perfect labels and annotations, and are rich in categories that cover all kinds of common objects, but such data sets also have an obvious functional shortcoming in actual use: they are not really suitable for use in practical scenarios of specific and approximate fine-grained objects. Therefore, in practical applications, most deep learning networks put into practical use rely on custom data sets manually annotated in specific scenarios.

SUMMARY OF THE INVENTION

Aiming at how to quickly and efficiently generate, with few original materials, a custom data set that can be used for the training of a deep network, the present disclosure provides a data enhancement expansion method and system for deep learning based on an excellent target detection network such as Yolov3. A mechanical arm and a camera are controlled by an embedded device to photograph an instance of an object to be recognized around, so as to obtain detailed features of various angles and obtain original materials. Training data is greatly expanded by an automatic data enhancement system of the present disclosure, and then put into practical application of a deep network.

In the first aspect, the present disclosure provides a data enhancement expansion method for deep learning, including the following steps:

collecting original video data of a target to be recognized, and extracting original images of several recognized targets from the original video data;

extracting seed images of RoI outlines of the recognized targets from the original images;

performing an image enhancement operation on the seed images of the RoI outlines of the recognized targets, and randomly extracting the seed images subjected the image enhancement operation for image aliasing enhancement to obtain several composite images; and generating a data set based on the original images of the several recognized targets and the several composite images.

In the second aspect, the present disclosure further provides a data enhancement expansion system for deep learning, including:

a collection module, configured to collect original video data of a target to be recognized, and extract original images of several recognized targets from the original video data;

an image processing module, configured to extract seed images of RoI outlines of the targets to be recognized from the original images;

a composite image generation module, configured to perform an image enhancement operation on the seed images of the RoI outlines of the recognized targets, and randomly extract the seed images subjected the image enhancement operation for image aliasing enhancement to obtain several composite images; and a data set generation module, configured to generate a data set based on the original images of the several recognized targets and the several composite images.

In the third aspect, the present disclosure further provides a recognition method based on data enhancement expansion, including the following steps:

collecting original video data of a target to be recognized, and extracting original images of several recognized targets from the original video data;

extracting seed images of RoI outlines of the recognized targets from the original images;

performing an image enhancement operation on the seed images, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

In a fourth aspect, the present disclosure further provides a recognition system based on data enhancement expansion, including:

a collection module, configured to collect original video data of a target to be recognized, and extract original images of several recognized targets from the original video data;

an image processing module, configured to extract seed images of RoI outlines of the targets to be recognized from the original images;

a composite image generation module, configured to perform an image enhancement operation on the seed images of the RoI outlines of the recognized targets, and randomly extract the seed images subjected the image enhancement operation for image aliasing enhancement to obtain several composite images;

a data set generation module, configured to generate a data set based on the original images of the several recognized targets and the several composite images; and a recognition module, configured to send the data set to a network for training to obtain a trained network, and input data to be detected into the trained network for recognition.

In a fifth aspect, the present disclosure further provides a computer-readable storage medium for storing computer instructions that, when executed by a processor, complete the data enhancement expansion method for deep learning as described in the first aspect, or, complete the recognition method based on data enhancement expansion as described in the third aspect.

In a sixth aspect, the present disclosure further provides an embedded edge device, including a memory, a processor, and computer instructions stored in the memory and running on the processor, wherein the computer instructions, when executed by the processor, complete the data enhancement expansion method for deep learning as described in the first aspect, or, complete the recognition method based on data enhancement expansion as described in the third aspect.

Compared with the prior art, the present disclosure has the following beneficial effects:

1. According to the data enhancement expansion method for deep learning, image enhancement operation and then image aliasing enhancement are performed on seed image of RoI outlines of recognized targets to obtain several composite images, which solves the problem of how to quickly and efficiently generate a custom data set that can be used for deep network training in the case of few original materials, and reduces original data materials required when the custom data set for deep network training is obtained, and the original data materials are easy to obtain, with extremely low cost.
2. According to the data enhancement expansion system for deep learning, a training data set composed of composite images generated by a composite image generation module and original images has diversity, the technical problems of how to improve the authenticity of the training data set and ensure the recognition effect are solved, and the training data set obtained has high authenticity and can be really put into a deep learning network to achieve good recognition results.
3. The recognition system based on data enhancement expansion solves the problem of how to automatically generate a custom data set that can be used for deep network training through a composite image generation module, a data set generation module and a recognition module, so that full automation of data expansion is achieved after original materials are obtained, and the time efficiency of actual application of the deep learning network is greatly improved. The application framework proposed by the recognition system having data collection at the terminal with an embedded terminal as the operation core, target detection at the terminal, and calculation and training integrated at a back-end server can greatly promote the actual application of the deep learning network.

BRIEF DESCRIPTION OF THE DRAWINGS

The accompanying drawing constituting a part of the present application is intended to provide a further understanding of the present application, and the illustrative embodiments of the present application and the descriptions thereof are intended to interpret the present application and do not constitute improper limitations to the present application.

FIG. 1 is a flowchart of a data enhancement expansion method for deep learning according to the present disclosure.

DETAILED DESCRIPTION OF EMBODIMENTS

The present disclosure will be further illustrated below in conjunction with the accompanying drawing and embodiments.

It should be noted that the following detailed descriptions are exemplary and are intended to provide further descriptions of the present application. All technical and scientific terms used herein have the same meanings as commonly understood by those ordinary skilled in the art to which the present application belongs, unless specified otherwise.

It should be noted that terms used herein are intended to describe specific embodiments only rather than to limit the exemplary embodiments according to the present application. As used herein, the singular form is also intended to comprise the plural form unless otherwise indicated in the context. In addition, it should be understood that when the terms "contain" and/or "comprise" are used in the description, they are intended to indicate the presence of features, steps, operations, devices, components and/or combinations thereof.

EXPLANATION OF TERMS

RoI: Region of Interest. RoI refers to a region containing a target to be processed or recognized that is outlined from a processed image by a box, an irregular polygon or the like, that is, an image region of interest.

Seed image: in this method, an image containing only a RoI of an original image based on the RoI outline extracted in the previous step as a mask.

Canny operator: Canny edge detection algorithm is a multi-level edge detection algorithm developed by John F. Canny. Specific steps are: apply Gaussian filtering to smooth an image so as to remove noise; find intensity gradients of the image; apply non-maximum suppression technology to eliminate false detection of boundaries; apply a dual-threshold method to determine possible (potential) boundaries; and use hysteresis technology to track boundaries.

Yolov3: excellent One-Stage target detection network so far. It can maintain a high level of performance in both accuracy and speed, making it the first choice for networks in most actual target detection applications.

IoU: Intersection over Union, which is a standard for measuring the accuracy of detecting a corresponding object in a specific data set. IoU is a simple measurement standard. As long as a task of a bounding box is obtained in the output, IoU can be used for measurement.

mAP@75: mAP, mean Average Precision, indicating a mean of various calculated APs in different categories. The mean herein refers to a performance of various objects on the data set for the detection algorithm; @75 refers to an effective threshold of IoU in a PR curve drawn when calculating APs, and herein refers to an effective threshold when the IoU is greater than 75%.

Aliasing enhancement: first perform a traditional image enhancement method such as random brightness adjustment, random blurring, or random rotation from each instance data set, then perform random extraction, cut and paste the target calibrated by the RoI outline to another image, repeat the operation to generate and synthesize a large number of training images, and update labels at the same time to enrich the data set. This step is a key step to greatly improve the mAP@75 of the network, and is the key to the data enhancement method.

Embodiment 1

A data enhancement system consists of 4 parts: obtaining of original data, data enhancement expansion, sending to a back-end server for network training, and uploading a weight file to an embedded edge device for forward propagation detection. This system focuses on the second part of data enhancement expansion, which expands a small amount of original materials that cannot complete a training task to a training data set that can be applied to deep network training. At the same time, also achieve the application system having data collection at the terminal with an embedded terminal as the operation core, target detection at the terminal, and calculation and training integrated at the back-end server.

As shown in FIG. 1, a data enhancement expansion method for deep learning includes the following steps:

collecting original video data of a target to be recognized, and extracting original images of several recognized targets from the original video data;

obtaining an outline of a RoI of the target to be recognized from the original images, and cutting images of the target to be recognized with the outline as a boundary to obtain seed images of the RoI;

performing an image enhancement operation on the cut seed images, and randomly extracting the seed images subjected the image enhancement operation for image aliasing enhancement to obtain several composite images; and generating a data set based on the several original images of the target to be recognized and the several composite images.

Further, the step of collecting original video data of a target to be recognized includes: photographing the target to be recognized around in a pure color background to obtain the original video data. As a preferred specific implementation, an instance of the target to be recognized is photographed around in the pure color background, using an embedded deep learning platform such as Nvidia-TX2 as a control terminal, through an interface provided by a mechanical arm and an interface provided by a camera bound to the mechanical arm, to obtain the original video data, wherein only one object is in the video data, and its detailed features and textures are obtained as much as possible by the photographing; and n video files with labels (label information distinguishes objects as labels) corresponding to the obtained original materials (that is, n instances) are uploaded to a back-end server for next data enhancement processing.

Further, the step of extracting original images of several recognized targets from the original video data includes: obtaining the original images in uniform set frames from the original video data. As a preferred specific implementation, the obtained original video data is uploaded to the back-end server. In the server, original images of various objects are uniformly obtained every 30 frames (increased or decreased as required) from various types of videos obtained. For example, about 120 images can be captured from a video section of two-minute. Through this step, n*120 original image materials are obtained, and each image contains only one object with its label.

Further, the step of extracting an image region of interest (ROI) of the target to be recognized from the original images includes:

obtaining a preliminary target outline of recognized target from the original images, and determining a preliminary RoI outline based on the outline as a boundary;

performing image morphology processing on the preliminary RoI outline to obtain a RoI outline closer to the target;

selecting an outline with the highest confidence from the target outlines closer to the targets based on integrating an outline area, centroid positions of top and bottom images, and change level in the centroid position and outline area of the target;

smoothing the outline with the highest confidence to obtain and determine a final RoI outline; and obtaining outline points of the target to be recognized in the final RoI outline, and generating an outline file and a label file corresponding to each image. As a preferred specific implementation, a Canny operator is used to determine the preliminary target outline of the image, and then appropriate image morphology processing (corrosion, expansion, etc.) is performed on the target to obtain the target outline closer to the target. At this time, besides the target outline, there may be other outlines determined by the camera or fine noise on the pure color background. This method select the outline with the highest confidence based on integrating the centroid position of the target, the outline area, the centroid positions of the top and bottom images (because videos and images are continuous), and the change level in the outline area. After the target outline is determined, the outline is smoothed to obtain a more accurate final RoI outline. Meanwhile, a RoI outline point file and a label file corresponding to each image are generated.

Further, the step of performing an image enhancement operation on the seed image of the RoI outline of recognized target includes: performing a rotation operation, a blur operation and a brightness change operation on each recognized target. The rotation operation includes: generating a rotation matrix after selecting a rotation angle, and calculating the position of each pixel after rotation through the obtained rotation matrix; the blur operation includes: performing different degrees of blur operation on the image by using Gaussian blur for blur operation, by selecting Gaussian kernels of different sizes and calculating Gaussian weights under different Gaussian kernels; and the brightness change operation includes: adjusting parameters $\alpha$ and $\beta$ to realize brightness changes. The selected angle $\theta$, the the Gaussian kernel G, and the parameters $\alpha$ and $\beta$ are all random values, and a scale change factor R can also be selected randomly to make the size of the image is R times of the original size. As a preferred specific implementation, the image is subjected to traditional data enhancement operations, the outline points of the target are obtained in the previous step, and then each target is subjected to rotation, blurring and brightness change operations. The outline after the rotation can be calculated based on the previously extracted outline points, and the blur operation and the brightness change operation do not change the outline position of the image, so the outline obtained in the previous step can be used directly after transformation.

Rotation operation: a rotation angle $\theta$ is selected, and a rotation matrix M is generated.

$$M = \begin{bmatrix} \cos\theta & -\sin\theta \\ \sin\theta & \cos\theta \end{bmatrix} \tag{1}$$

Through the obtained rotation matrix, the position of each pixel after the rotation is calculated:

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix} \tag{2}$$

Blur operation: in this method, in order to make the generated image blur more in line with the imaging law of the camera, Gaussian blur is used. Different degrees of blur operation are performed on the image by selecting Gaussian kernels of different sizes, and calculating Gaussian weights G(x,y) under different Gaussian kernels, where σ is a standard deviation of normal distribution; and e is a natural constant, which is the base of a natural logarithmic function.

$$G(x, y) = \frac{1}{2\pi\sigma^2} e^{-(x^2+y^2)/2\sigma^2} \tag{3}$$

Brightness adjustment: in order to make the image conform to the imaging law under different photographing conditions, parameters α and β are adjusted to realize brightness change.

$$L(x,y) = \alpha * f(x,y) + \beta \tag{4}$$

Further, the step of randomly extracting the seed images subjected the image enhancement operation for image aliasing enhancement includes: randomly extracting one image after the image enhancement operation as a first target image, using the first target image as a background image, randomly extracting another target image except the first target image as a second target image, obtaining a RoI outline of the second target image, obtaining a mask according to the target outline of the second target image, cutting the recognized target of the second target image through the mask, and putting the cut target into the first target image after a shift, zooming or expansion operation to obtain several composite images. As a preferred specific implementation, aliasing enhancement is performed. After traditional data enhancement (rotation, blur, brightness adjustment), one image is used as a background image (that is, the background image contains one object instance), another target image is selected at the same time, a target outline in the target image is obtained from a text file that records the target image, a mask is obtained from the outline to cut the target in the target image, and then the cut target is put into the background image after an operation of shift, zooming/expansion or the like to achieve an operation of synthesizing an image.

In order to achieve the diversity of composite images, traditional enhancement is combined with aliasing enhancement. When images are synthesized, traditional enhancement is performed on the images, the images are randomly extracted to obtain various possible target combinations, and enhancement parameters are randomly generated to obtain multiple states of the target in the images.

Specifically: after the background image and the target image are randomly selected, an angle θ is first randomly selected, a rotation matrix M is determined, the target image is rotated, a rotated outline is calculated at the same time, then a size of a Gaussian kernel G with a random value represents a degree of blur of this target, a blur operation is performed, and parameters α and β with random values represent a degree of brightness change for a brightness change operation.

Then a scale change factor R is randomly selected to make the size of the image being R times of the original size, an Offset factor is randomly generated to determine an offset position of the target in the background image, and a stacking degree IoU of the target during the synthesis operation and all the above random values are ensured within appropriate thresholds. A denotes a cut target rectangular box, and B denotes a target rectangular box in the background image, then:

$$IoU = \frac{S(A \cap B)}{S(A \cup B)} \tag{5}$$

After that, the target image is cut based on the new outline and put into the background image at a specified position. At this time, the synthesized new image contains two objects of an original object in the background image and a new object put, so as to realize a combination of multiple instances. Therefore, the diversity of instance angles of the data set and the diversity of instance combinations in the images are achieved. In this operation, the cut target is put into the background image. If the cut target is stacked with the target in the background image, the new target put is located at the top and called a top image layer, and the image as the background image and the instance target thereof are located at a bottom image layer.

Moreover, due to the imaging principle of the camera, in a real (non-synthesized) image, if an image contains multiple objects, the focus mostly focuses on the object in the front; if the multiple objects are farther apart in the longitudinal direction, the non-focused objects will be blurred; at the same time, the longitudinally far targets are smaller than the longitudinally close targets in imaging. In order to improve the authenticity of the generated composite images (after all, the network is used to test real images), various value ranges exceeding parameters are subjected to authenticity adjustment, for example: when burr parameters are selected for the bottom image layer, the values of the burr parameters will be larges. At the same time, the bottom image layer always tends to shrink during the zooming/expansion operation, while the top image layer is more likely to expand.

Further, the step of generating a data set based on the original images of several recognized targets and the several composite images includes: constituting a data set with a set number of composite images and a set number of original images as a whole. As a preferred specific implementation, 10,000 (customizable) aliased images are generated. The images may contain multiple objects, or may contain a single object. The objects are overlapped sequentially and in line with the imaging law of the camera, so that the data set is as close to the real data as possible while the diversity is guaranteed. In this way, mass data that has strong diversity and strong authenticity and can be used for the training of a deep learning network is generated only by simple obtaining of original data, which greatly saves the time and capital cost for obtaining the data set that is manually obtained previously.

Embodiment 2

A data enhancement expansion system for deep learning includes:

a collection module, configured to collect original video data of a target to be recognized, and extract original images of several recognized targets from the original video data;

an image processing module, configured to obtain outline images of the recognized targets from the original images;

a composite image generation module, configured to perform an image enhancement operation on the outline images of the recognized targets, and randomly extract the outline images after the image enhancement operation for image aliasing enhancement to obtain several composite images; and a data set generation module, configured to generate a data set based on the original images of the several recognized targets and the several composite images.

Further, the specific configurations of the collection module, the image processing module, the composite image generation module, and the data set generation module correspond to the specific steps of the data enhancement expansion method for deep learning in Embodiment 1.

Embodiment 3

The present disclosure further provides an application of the data enhancement expansion method for deep learning, including:

creating a pure color photographing background and determining an object to be detected. If multiple types of objects need to be detected, a single instance of each type of object is placed in a photographing center and photographed around. This method is used when the fine-grained characteristics of each type of object are similar or even the same (such as: different brands of AA batteries). When individual objects with similar fine granularity (for example, my cup vs. his cup) need to be distinguished, all instances to be detected are placed in the photographing center and photographed around.

Under the control process of an embedded controller such as Nvidia-TX2, original video materials photographed are uploaded to a back-end remote server via a network, a piece of video corresponds to an instance (a category), and the original video materials are labeled and enter a data enhancement stage in the back-end server.

After receiving the original video materials, the back-end server performs data enhancement processing for each type in turn:

Frames are extracted from each type of video to form an original image data set, and images are named with labels as prefixes.

Outlines of each type of images are extracted in turn, and outline files and label box files are generated.

Aliasing enhanced images are generated: an image enhancement method such as random brightness adjustment, random blurring, or random rotation is performed on each type, then random extraction is performed, a target calibrated by an outline is cut and pasted to another image, the operation is repeated to generate and synthesize a large number of training images, and labels are correspondingly updated at the same time to enrich the data set and improve the training effect of a deep learning network. So far, a custom data set for this scenario is generated.

The generated custom data set is divided into a training set and a verification set, which are sent to a network (such as Yolov3) for training. After the training is completed, a weight file generated by training in the back-end server is downloaded to an embedded device, and the embedded device finally performs real-time detection of an actual scenario.

In other embodiments, the present disclosure further provides:

An recognition method based on data enhancement expansion, including the following steps:

collecting original video data of a target to be recognized, and extracting original images of several recognized targets from the original video data;

obtaining outline images of the recognized targets from the original images;

performing an image enhancement operation on the outline images of the recognized targets, and randomly extracting the outline images after the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

Further, after the step of generating the data set is completed, the data set is divided into a training set and a verification set, which are sent to the network for training.

Further, the step of inputting data to be detected into the trained network for recognition includes: downloading the generated weight file to an embedded edge device after the training is completed, executing a predetermined command to photograph an object to be recognized in a real scenario to obtain data to be detected, and inputting the data to be detected to the embedded edge device for recognition.

Further, the specific steps of obtaining outline images of the recognized targets from the original images, performing an image enhancement operation, performing image aliasing enhancement, and generating a data set respectively correspond to the specific steps of the data enhancement expansion method for deep learning in the foregoing embodiment.

A recognition system based on data enhancement expansion, including:

a collection module, configured to collect original video data of a target to be recognized, and extract original images of several recognized targets from the original video data;

an image processing module, configured to extract seed images of RoI outlines of the recognized targets from the original images;

a composite image generation module, configured to perform an image enhancement operation on the seed images of the RoI outlines of the recognized targets, and randomly extract the seed images subjected the image enhancement operation for image aliasing enhancement to obtain several composite images;

a data set generation module, configured to generate a data set based on the original images of the several recognized targets and the several composite images; and a recognition module, configured to send the data set to a network for training to obtain a trained network, and input data to be detected into the trained network for recognition.

Further, the specific configurations of the collection module, the image processing module, the composite image generation module, the data set generation module and the recognition correspond to the specific steps of the recognition method based on data enhancement expansion in the foregoing embodiment.

A computer-readable storage medium is used to store computer instructions. When the computer instructions are executed by a processor, the data enhancement expansion method for deep learning as described in any of the foregoing embodiments is completed.

An embedded edge device includes a memory, a processor, and computer instructions stored in the memory and running on the processor. When the computer instructions are executed by the processor, the data enhancement expansion method for deep learning as described in any of the foregoing embodiments is completed.

This method uses a mechanical arm, which can make the entire process fully automatic, different from the steps of manual intervention in the traditional method; a complete set of deep learning application is formed, including data collection, data enhancement, data training, and practical application of implementation; the proposed application framework having data collection at the terminal with an embedded terminal as the operation core, target detection at the terminal, and calculation and training integrated at a back-end server can greatly promote the actual application of a deep learning network; and the aliasing data enhancement method greatly improves the richness of the data set and the training effect of the network.

Although the specific embodiments of the present disclosure are described above in combination with the accompanying drawing, the protection scope of the present disclosure is not limited thereto. It should be understood by those skilled in the art that various modifications or variations could be made by those skilled in the art based on the technical solution of the present disclosure without any creative effort, and these modifications or variations shall fall into the protection scope of the present disclosure.

The invention claimed is:

1. A data enhancement expansion method for deep learning, comprising the following steps:
    collecting original video data of a target to be recognized, and extracting original images of several recognized targets from the original video data;
    extracting seed images of RoI outlines of the recognized targets from the original images;
    performing an image enhancement operation on the seed images of the RoI outlines of the recognized targets, and randomly extracting the seed images subjected the image enhancement operation for image aliasing enhancement to obtain several composite images; and
    generating a data set based on the original images of the several recognized targets and the several composite images.

2. The data enhancement expansion method for deep learning according to claim 1, wherein the step of collecting original video data of a target to be recognized comprises: photographing the target to be recognized around in a pure color background to obtain the original video data.

3. A non-transitory computer-readable storage medium for storing computer instructions, wherein the computer instructions, when executed by a processor, complete the data enhancement expansion method for deep learning according to claim 2, or, complete the recognition method based on data enhancement expansion comprising the following steps:
    collecting original video data of a target to be recognized, and extracting original images of several recognized targets from the original video data;
    extracting seed images of RoI outlines of the recognized targets from the original images;
    performing an image enhancement operation on the seed images of the RoI outlines of the recognized targets, and randomly extracting the seed images subjected the image enhancement operation for image aliasing enhancement to obtain several composite images;
    generating a data set based on the original images of the several recognized targets and the several composite images;
    sending the data set to a network for training to obtain a trained network; and
    inputting data to be detected into the trained network for recognition.

4. An embedded edge device, comprising a memory and a processor, and computer instructions stored in the memory and running on the processor, wherein the computer instructions, when executed by the processor, complete the data enhancement expansion method for deep learning according to claim 2, or, complete the recognition method based on data enhancement expansion comprising the following steps:
    collecting original video data of a target to be recognized, and extracting original images of several recognized targets from the original video data;
    extracting seed images of RoI outlines of the recognized targets from the original images;
    performing an image enhancement operation on the seed images of the RoI outlines of the recognized targets, and randomly extracting the seed images subjected the image enhancement operation for image aliasing enhancement to obtain several composite images;
    generating a data set based on the original images of the several recognized targets and the several composite images;
    sending the data set to a network for training to obtain a trained network; and
    inputting data to be detected into the trained network for recognition.

5. The data enhancement expansion method for deep learning according to claim 1, wherein the step of obtaining outline images of the recognized targets from the original images comprises:
    extracting seed images of RoI outlines of the recognized targets from the original images;
    performing an image enhancement operation on the seed images of the RoI outlines of the recognized targets, and randomly extracting the seed images subjected the image enhancement operation for image aliasing enhancement to obtain several composite images;
    selecting an outline image with the highest confidence from the target outlines closer to the targets based on integrating an outline area, centroid positions of top and bottom images, and change level in the centroid position and outline area of the target;
    smoothing the outline image with the highest confidence to obtain a final RoI outline; and
    obtaining outline points of the recognized target in the final RoI outline, and generating an outline file and a label file corresponding to each image.

6. A non-transitory computer-readable storage medium for storing computer instructions, wherein the computer instructions, when executed by a processor, complete the data enhancement expansion method for deep learning according to claim 5, or, complete the recognition method based on data enhancement expansion comprising the following steps:
    collecting original video data of a target to be recognized, and extracting original images of several recognized targets from the original video data;
    extracting seed images of RoI outlines of the recognized targets from the original images;
    performing an image enhancement operation on the seed images of the RoI outlines of the recognized targets, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

7. An embedded edge device, comprising a memory and a processor, and computer instructions stored in the memory and running on the processor, wherein the computer instructions, when executed by the processor, complete the data enhancement expansion method for deep learning according to claim 5, or, complete the recognition method based on data enhancement expansion comprising the following steps:

collecting original video data of a target to be recognized, and extracting original images of several recognized targets from the original video data;

extracting seed images of RoI outlines of the recognized targets from the original images;

performing an image enhancement operation on the seed images of the RoI outlines of the recognized targets, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

8. The data enhancement expansion method for deep learning according to claim 1, wherein the step of performing an image enhancement operation on the outline images of the recognized targets comprises: performing a rotation operation, a blur operation and a brightness change operation on each recognized target.

9. A non-transitory computer-readable storage medium for storing computer instructions, wherein the computer instructions, when executed by a processor, complete the data enhancement expansion method for deep learning according to claim 8, or, complete the recognition method based on data enhancement expansion comprising the following steps:

collecting original video data of a target to be recognized, and extracting original images of several recognized targets from the original video data;

extracting seed images of RoI outlines of the recognized targets from the original images;

performing an image enhancement operation on the seed images of the RoI outlines of the recognized targets, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

10. An embedded edge device, comprising a memory and a processor, and computer instructions stored in the memory and running on the processor, wherein the computer instructions, when executed by the processor, complete the data enhancement expansion method for deep learning according to claim 8, or, complete the recognition method based on data enhancement expansion comprising the following steps:

collecting original video data of a target to be recognized, and extracting original images of several recognized targets from the original video data;

extracting seed images of RoI outlines of the recognized targets from the original images;

performing an image enhancement operation on the seed images of the RoI outlines of the recognized targets, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

11. The data enhancement expansion method for deep learning according to claim 1, wherein the step of randomly extracting the outline images after the image enhancement operation for image aliasing enhancement comprises: randomly extracting one outline image after the image enhancement operation as a first target image, using the first target image as a background image, randomly extracting another target image except the first target image as a second target image, obtaining a target outline of the second target image, obtaining a mask according to the target outline of the second target image, cutting the recognized target of the second target image through the mask, and putting the cut target into the first target image after a shift, zooming or expansion operation to obtain several composite images.

12. A non-transitory computer-readable storage medium for storing computer instructions, wherein the computer instructions, when executed by a processor, complete the data enhancement expansion method for deep learning according to claim 11, or, complete the recognition method based on data enhancement expansion comprising the following steps:

collecting original video data of a target to be recognized, and extracting original images of several recognized targets from the original video data;

extracting seed images of RoI outlines of the recognized targets from the original images;

performing an image enhancement operation on the seed images of the RoI outlines of the recognized targets, and randomly extracting the seed images subjected the image enhancement operation for image aliasing enhancement to obtain several composite images;

generating a data set based on the original images of the several recognized targets and the several composite images;

sending the data set to a network for training to obtain a trained network; and inputting data to be detected into the trained network for recognition.

13. An embedded edge device, comprising a memory and a processor, and computer instructions stored in the memory and running on the processor, wherein the computer instructions, when executed by the processor, complete the data enhancement expansion method for deep learning according to claim 11, or, complete the recognition method based on data enhancement expansion comprising the following steps:
- collecting original video data of a target to be recognized, and extracting original images of several recognized targets from the original video data;
- extracting seed images of RoI outlines of the recognized targets from the original images;
- performing an image enhancement operation on the seed images of the RoI outlines of the recognized targets, and randomly extracting the seed images subjected the image enhancement operation for image aliasing enhancement to obtain several composite images;
- generating a data set based on the original images of the several recognized targets and the several composite images;
- sending the data set to a network for training to obtain a trained network; and
- inputting data to be detected into the trained network for recognition.

14. A non-transitory computer-readable storage medium for storing computer instructions, wherein the computer instructions, when executed by a processor, complete the data enhancement expansion method for deep learning according to claim 1, or, complete the recognition method based on data enhancement expansion comprising the following steps:
- collecting original video data of a target to be recognized, and extracting original images of several recognized targets from the original video data;
- extracting seed images of RoI outlines of the recognized targets from the original images;
- performing an image enhancement operation on the seed images of the RoI outlines of the recognized targets, and randomly extracting the seed images subjected the image enhancement operation for image aliasing enhancement to obtain several composite images;
- generating a data set based on the original images of the several recognized targets and the several composite images;
- sending the data set to a network for training to obtain a trained network; and
- inputting data to be detected into the trained network for recognition.

15. An embedded edge device, comprising a memory and a processor, and computer instructions stored in the memory and running on the processor, wherein the computer instructions, when executed by the processor, complete the data enhancement expansion method for deep learning according to claim 1, or, complete the recognition method based on data enhancement expansion comprising the following steps:
- collecting original video data of a target to be recognized, and extracting original images of several recognized targets from the original video data;
- extracting seed images of RoI outlines of the recognized targets from the original images;
- performing an image enhancement operation on the seed images of the RoI outlines of the recognized targets, and randomly extracting the seed images subjected the image enhancement operation for image aliasing enhancement to obtain several composite images;
- generating a data set based on the original images of the several recognized targets and the several composite images;
- sending the data set to a network for training to obtain a trained network; and
- inputting data to be detected into the trained network for recognition.

16. A data enhancement expansion system for deep learning, comprising:
- a collection module, configured to collect original video data of a target to be recognized, and extract original images of several recognized targets from the original video data;
- an image processing module, configured to extract seed images of RoI outlines of the recognized targets from the original images;
- a composite image generation module, configured to perform an image enhancement operation on the seed images of the RoI outlines of the recognized targets, and randomly extract the seed images subjected the image enhancement operation for image aliasing enhancement to obtain several composite images; and
- a data set generation module, configured to generate a data set based on the original images of the several recognized targets and the several composite images.

17. A recognition method based on data enhancement expansion, comprising the following steps:
- collecting original video data of a target to be recognized, and extracting original images of several recognized targets from the original video data;
- extracting seed images of RoI outlines of the recognized targets from the original images;
- performing an image enhancement operation on the seed images of the RoI outlines of the recognized targets, and randomly extracting the seed images subjected the image enhancement operation for image aliasing enhancement to obtain several composite images;
- generating a data set based on the original images of the several recognized targets and the several composite images;
- sending the data set to a network for training to obtain a trained network; and
- inputting data to be detected into the trained network for recognition.

18. A recognition system based on data enhancement expansion, comprising:
- a collection module, configured to collect original video data of a target to be recognized, and extract original images of several recognized targets from the original video data;
- an image processing module, configured to extract seed images of RoI outlines of the recognized targets from the original images;
- a composite image generation module, configured to perform an image enhancement operation on the seed images of the RoI outlines of the recognized targets, and randomly extract the seed images subjected the image enhancement operation for image aliasing enhancement to obtain several composite images;
- a data set generation module, configured to generate a data set based on the original images of the several recognized targets and the several composite images; and
- a recognition module, configured to send the data set to a network for training to obtain a trained network, and input data to be detected into the trained network for recognition.

\* \* \* \* \*